Oct. 11, 1966     R. D. BROWN     3,277,652
ELASTIC FLUID TURBINE POWER PLANT APPARATUS
Filed Sept. 18, 1964     2 Sheets-Sheet 1

INVENTOR
Ralph D. Brown
BY
Frank Cristiano Jr.

Oct. 11, 1966   R. D. BROWN   3,277,652
ELASTIC FLUID TURBINE POWER PLANT APPARATUS
Filed Sept. 18, 1964   2 Sheets-Sheet 2

United States Patent Office 3,277,652
Patented Oct. 11, 1966

3,277,652
ELASTIC FLUID TURBINE POWER PLANT
APPARATUS
Ralph D. Brown, Springfield, Pa., assignor to Westinghouse Electric Corporation, Pittsburgh, Pa., a corporation of Pennsylvania
Filed Sept. 18, 1964, Ser. No. 397,514
6 Claims. (Cl. 60—73)

This invention relates to multi-unit elastic fluid turbine power plants, more particularly to an arrangement for minimizing the overheating effect in at least one of the turbine units when the motive elastic fluid is entrapped therein by closure of valve structure controlling flow of the motive fluid to and from the one turbine unit.

In reheat elastic fluid (for example, steam) turbine power plants of the multi-unit type comprising a high pressure turbine, at least one lower pressure turbine and a reheater for reheating the partially expanded fluid from the high pressure turbine before admission to the lower pressure turbine, the flow of motive fluid to the high pressure turbine is controlled by governing valves and the fluid flow from the reheater to the lower pressure turbine is controlled by an interceptor valve. These valves are jointly closed rapidly by a primary system including an auxiliary governor which is responsive to the rapid rate of rotor acceleration that results from a sudden loss of load on the turbine, or other power plant malfunctions.

In addition to the above primary speed system there is further provided a secondary or "back-up" system including a throttle valve disposed in series with and upstream of the governing valves, and a reheat stop valve in series with and between the reheater and the interceptor valve. The secondary system valves are rapidly closed jointly when the rotor speed exceeds a preset value, due to failure of some essential service for the turbine, or when failure in the turbine load system (for example, the electrical system of a generator) occurs.

The joint closing of the valves in the secondary system results in the entrapment of a large mass of motive fluid at high temperature and pressure in the high pressure turbine, reheater and interconnecting conduits. Since the spinning turbine rotor has a large moment of inertia, it continues to rotate for a considerable period of time thereafter and acts as a compressor, thereby pumping the entrapped motive fluid toward the exhaust outlet of the high pressure turbine with a compressing action. The entrapped motive fluid is thus violently agitated by the turbine rotor and the fluid friction is effective to raise the temperature of the motive fluid well above the normal operating turbine temperature.

The turbine rotor and associated components are usually designed to operate at a temperature close to the maximum safe temperature, hence the increased temperature conditions may cause a serious reduction in the strength of the above components with ensuing serious damage to the turbine.

Many notable schemes have heretofore been proposed for venting or dumping the entrapped motive fluid from the high pressure turbine. Although these schemes are adequate and reliable in performance, they are costly and complicated.

In view of the above, it is an object of the invention to provide a simple, yet reliable arrangement for minimizing the overheating effect of the motive fluid that is entrapped in a turbine during an emergency shut down of a turbine power plant of the multi-unit type.

Another object of the invention is to provide an arrangement in which the entrapped motive fluid that is pumped toward the exhaust outlet of the turbine by compressor action is permitted to return to the motive fluid inlet of the turbine for unimpeded continuous recirculation through the turbine.

A further object is to provide an arrangement for recirculating the entrapped motive fluid by means including valve structure responsive to a fluid pressure differential induced by a fluid pressure increase at the turbine exhaust outlet and/or a fluid pressure decrease at the turbine inlet after an emergency shutdown.

Briefly, in accordance with the invention there is provided a bypass conduit connecting the high pressure turbine inlet conduit to the exhaust outlet conduit and a fluid pressure responsive valve in the bypass conduit. The fluid pressure responsive valve is preferably a simple check valve arranged in the bypass in such a manner that in normal operation it is maintained in the closed position by the high pressure of the motive fluid in the turbine inlet conduit.

However, after an emergency shut-down occurs and the flow of high pressure motive fluid to the high pressure turbine is interrupted, a reversal in fluid pressure acting on the valve occurs due to the pumping action of the turbine rotor. Since the entrapped motive fluid is pumped toward the exhaust outlet conduit, the fluid pressure in the outlet conduit is increased and concomitantly the fluid pressure in the inlet conduit is decreased, thereby causing the valve to open. As the valve opens, the entrapped motive fluid is permitted to flow through the bypass conduit and recirculate through the turbine, thereby minimizing the agitation of the fluid by the rotor and maintaining the temperature at an acceptable level during the period required for the speed of the turbine rotor to decrease to a low value.

The above and other objects of this invention will become more apparent upon a reading of the detailed description of this invention taken in connection with the accompanying drawings, in which.

Figure 1:
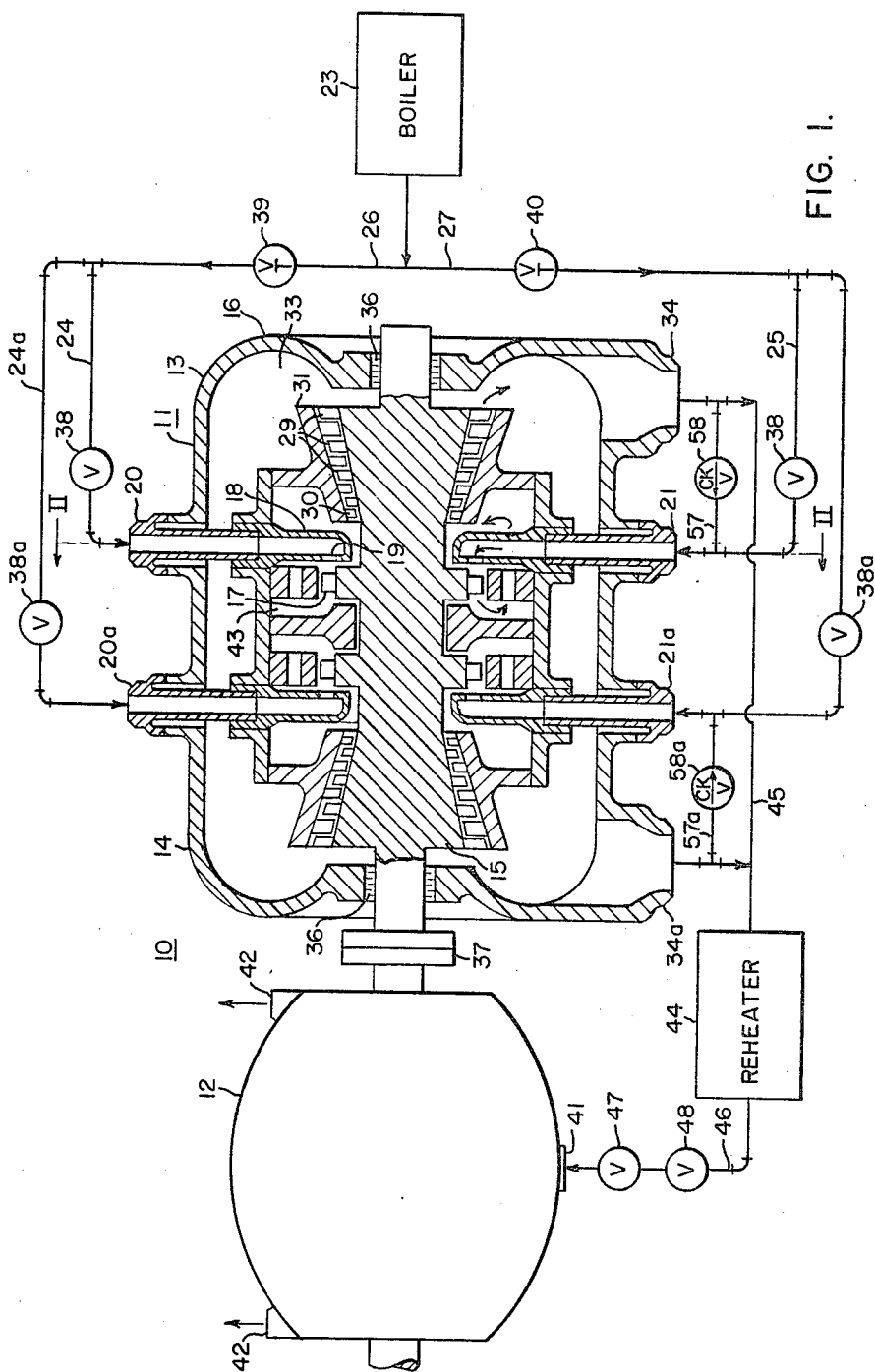
FIGURE 1 is a diagrammatic view illustrating a multi-unit turbine power plant having the invention incorporated therein.
Figure 2:
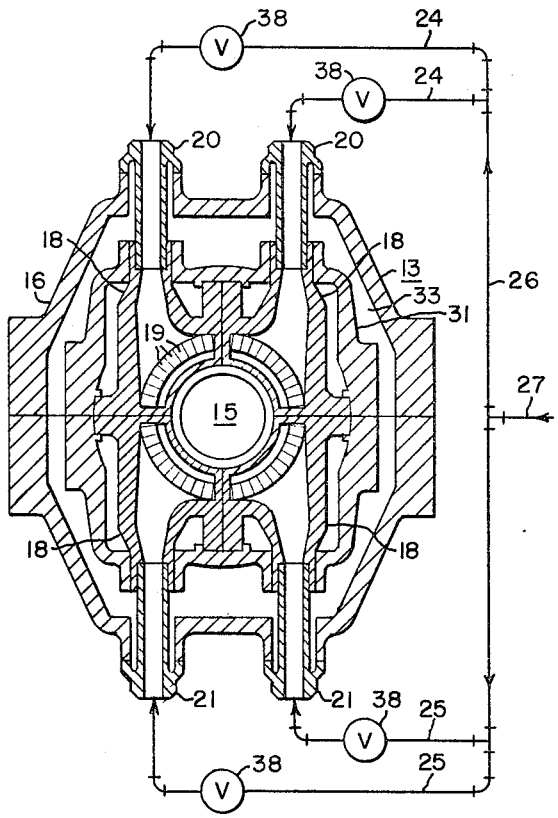
FIG. 2 is a cross-sectional view taken on line II—II of FIG. 1.

Referring to the drawings in detail, in FIG. 1 there is shown a multi-unit axial flow steam turbine power plant generally designated 10 comprising a high pressure turbine unit 11, a lower pressure turbine unit 12, and, if so desired, additional and still lower pressure turbine units (not shown).

The high pressure turbine unit 11, as illustrated, is of the opposed double-flow type having a right-hand steam expansion section 13 and a left-hand steam expansion section 14 disposed in coaxial alignment with each other and including a rotor 15 disposed within a casing 16 employed in conjunction with both the left-hand and right-hand sections 14 and 13. Since the left and right-hand sections may be substantially identical, only the right-hand section 13 will be described in detail, it being understood that the left-hand section 14 is substantially identical thereto, but a mirror image thereof, as illustrated in FIG. 1.

The right-hand section of the rotor 15 is provided with a first annular row of blades 17 which may be of the well-known impulse type and disposed in operative relation with suitable stationary nozzle box structure 18 having an annular array of nozzle blades 19 for directing the motive steam thereto from a plurality of pairs of (for example, two) steam inlet conduits 20 and 21 extending through the casing 16. Steam is directed to the conduits 20, 21 from a suitable boiler 23 by parallel conduit structures 24 and 25 which, in turn, are connected to main conduit structures 26 and 27 connected to the boiler 23.

The rotor structure 15 is further provided with a plurality of annular rows of reaction blades 29 cooperatively associated with an equal plurality of rows of stationary blades 30 supported within an inner casing structure 31. The internal casing structure 31 together with the external casing 16 forms an annular exhaust space 33 which is in direct communication with an exhaust outlet conduit 34 formed in the outer casing 16.

The rotor structure 15 may be suitably supported in any manner (not shown) and, at the portions extending through the casing 16, suitable labyrinth seal structure 36 may be employed to minimize leakage of exhaust steam therethrough during operation.

As illustrated, the rotor 15 of the turbine unit 11 is directly connected to the rotor (not shown) of the lower pressure turbine unit 12 by a suitable coupling 37 to jointly drive a common load, such as an electrical generator (not shown). However, the two units 11 and 12 need not be connected as shown and may be employed to drive separate loads, as well known in the art.

Steam flow through the branch conduits 24 and 25 is controlled by governing valves 38 interposed therein adjacent the inlet conduit structures 20 and 21 and, as well known in the art, the valves 38 are employed to control the speed of the rotor 17 by varying the flow of steam to the nozzle box structures 18.

In addition thereto, throttle valve structures 39 and 40 are employed upstream of the governing valve structures 38 in the main conduits 26 and 27 from the boiler 23. In normal operation, the throttle valve structures 39 and 40 are maintained in the fully open position.

The turbine unit 12, as illustrated, is also of the double opposed flow type and is provided with a steam inlet 41 and a pair of exhaust steam outlets 42. The turbine unit 12 is motivated by steam after partial expansion in the turbine unit 11, as will be subsequently described.

As thus far described, the operation of the power plant is as follows. With the throttle valves 39 and 40 open and the governing valves 38 open to the degree required to maintain speed of the rotor 15, steam is directed from the boiler 23, through the main conduits 26, 27, the throttle valves 39, 40, branch conduits 24 and 25, the governing valves 38 and the steam inlet structures 20 and 21 to the nozzle box structures 18. The steam is thence directed past the impulse blades 17 in a direction from right to left into an annular impulse space or chamber 43 and is then reversed in direction and flows to the right around the nozzle box structure 19 and through the reaction blading 29 for further expansion. The thus partially expanded steam is subsequently directed into the exhaust space 33 and thence through the exhaust outlet 34. During such expansion in the rotor blading, the rotor 15 is rotated. The flow of exhaust steam from the exhaust outlet 34 is thence directed to a suitable reheater 44 by a suitable interconnecting conduit 45 and reheated to a higher value before admission to the inlet 41 of the lower pressure unit 12 by way of a reheater outlet conduit 46.

The flow of steam from the reheater 44 of the turbine unit 12 is controlled by an interceptor valve structure 47 and by a reheat stop valve structure 48 disposed upstream of the interceptor valve and in series therewith. Hence, it will be noted that, if the interceptor valve 47 and/or the reheat stop valve 48 is in the closed position, flow of steam from the reheater to the turbine unit 12 is interrupted, whereas when both of these valves are in their open positions, flow of steam from the reheater to the turbine unit 12 is maintained.

The interceptor valve 47 is maintained in the fully open position during normal operation of the power plant, while the governing valve structures 38 are regulated by suitable control apparatus (not shown) to regulate the speed of the rotor structure 15. However, as known in the art, these valves are jointly and rapidly moved to the closed position by a primary system (not shown) including an auxiliary governor which is responsive to the rapid rate of rotor acceleration that results from a sudden loss of load on the turbine units or other power plant malfunctions.

Figure 3:
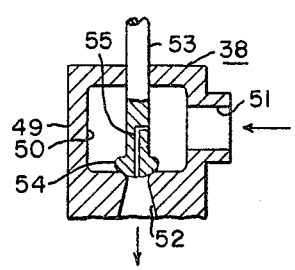
FIG. 3 is an axial sectional view of one of the valves diagrammatically shown in FIG. 1.

The governing valve structures 38 may be of the type shown in FIG. 3 including a housing structure 49 forming a suitable steam chest 50 having a steam inlet 51 connected to the associated branch conduit, such as conduit 24, and a steam outlet 52 connected to the associated turbine steam inlet, such as inlet structure 20. Flow of steam through the valve structure 38 is controlled by an axially movable valve member 53 of the poppet type having a mushroom shaped head 54 cooperatively associated with the valve outlet 52. However, the movable valve member 53 is provided with a passageway 55 forming a leaking flow circuit for motive steam through the outlet 52, when the valve member 53 is the closed position shown in FIG. 3. Accordingly, when the governing valves 38 and the interceptor valve 47 are suddenly moved to the closed position to interrupt flow of steam through the high pressure turbine unit 11 in response to a rapid rate of rotor acceleration, sufficient steam flow is admitted through the valve passageways 55 in the four valves 38 to circulate steam through the normal expansion flow path in the turbine 11 to terminate acceleration of the rotor and still permit circulation of the steam therethrough to prevent overheating.

The leakage flow through the governor valves 38 when in the closed position, as described above, is readily accommodated by the large volume of the reheater 44 and the leakage of steam through the labyrinth seal structures 36.

The throttle valves 39 and 40 and the reheat stop valve 48 are controlled by a suitable secondary or "back up" system (not shown), responsive to speed of the rotor 15. Accordingly, if after the primary system has closed the governing valves 38 and the interceptor valve 47, the speed of the rotor continues to climb due to failure of some essential service of the power plant or failure in its load system (not shown), these valves are closed jointly when the rotor speed exceeds a preset value.

The joint closing of the throttle valves 39, 40, and the reheat stop valve 48 in the secondary system results in entrapment of a large mass of steam at high temperature and pressure in the high pressure turbine unit 11, the reheater 44 and the interconnecting conduit structure 45. Since the rotor has a large moment of inertia, it continues to rotate for a considerable amount of time after the interruption of motive steam thereto and acts as a compressor, thereby pumping the entrapped steam toward the exhaust outlet 34 and into the reheater 44 by way of the interconnecting conduit structure 45. The entrapped steam is thus violently agitated by the blading 17 and 29 on the rotor 15, especially the reaction blading 29, and the fluid friction thus incurred is effective to raise the temperature of the steam well above the normal operation range of the turbine. Since the turbine components are designed to operate at a value near to their maximum safe temperature value, the heat rise in the thus agitated steam that is entrapped may cause a reduction in strength of the turbine components with possible serious damage resulting in the turbine.

Since during the ensuing spinning of the rotor 15 and its effective compressor action on the entrapped motive steam, the steam is pressurized in the exhaust space 33, the conduit structure 45 and the reheater 44, the converse effect, i.e. a reduction in pressure is obtained in the steam inlet structures 20, 21 and the associated nozzle box structure 18, as well as the impulse chambers 40.

In accordance with the invention, a bypass conduit structure 57 is interposed between the steam inlet conduit 21 and the exhaust outlet conduit 34, and a suitable pressure responsive valve structure 58 is interposed in the bypass conduit 57.

The valve structure 58, as illustrated, may be a check valve arranged to such a manner that during normal operation when steam flow from the boiler 23 prevails in the inlet conduit structure 21, the pressure is imposed on the check valve 58 to maintain it in its closed position. However, after an emergency shut-down, wherein the throttle valves 39 and 40 and the reheat stop valve 48 are closed, the check valve 58 is moved to its open position by the ensuing reduction in pressure in the steam inlet conduit structure 21 and/or the rise in pressure of the steam in the exhaust outlet 34 and the interconnecting conduit structure 45. Stated in another manner, the check valve 58 is maintained in closed position during normal operation by the pressure drop across the conduit 57 imposed by the high pressure of the motive steam in the conduit structure 21 and the lower pressure of the partially expanded motive steam in the exhaust outlet 34 and interconnecting conduit structure 45, while, after emergency shut-down, the check valve 58 is moved in opening direction by the pressure drop imposed thereon by the reduction of steam pressure in inlet conduit structure 21 and the rise in steam pressure in the exhaust outlet conduit 34 and interconnecting conduit structure 45 caused by the compressor action of the reaction blading.

Accordingly, after the check valve 58 is moved to the open position as explained above, the motive steam that is pumped by the rotor structure 15 by compressor action into the exhaust outlet conduit structures 34 and 45 is permitted to flow through the bypass conduit 57 and into the steam inlet 21 and nozzle box structure 18 to freely recirculate through the blading of the high pressure turbine unit. Hence, because of the free circulation of the steam in a substantial loop circuit as described above, the temperature of the steam during the rotation of the rotor by its own momentum is maintained within a reasonable and safe level that the turbine unit 11 can safely endure.

The large volume of steam entrapped in the reheater 44 is used as a heat sink to absorb the heat resulting from any agitation and fluid friction that may occur, thereby maintaining the temperature rise within a reasonable and safe level. Also, during such recirculation, steam entrapped in the reheater 44 is permitted to flow in reverse direction through the interconnecting conduit structure 45 to join with the circulating steam, thereby replacing the steam that is bled through the labyrinth seal structure 36 and thereby further enhancing the freedom of circulation of the steam to maintain the temperature of the steam at an acceptable level.

As the rotational speed of the rotor 15 decreases, a concomitant reduction in compressor action of the turbine blading and circulation of the steam occurs.

The left-hand section 14 of the high pressure turbine unit 11 is identical in structure and operates in substantially the identical manner as the right-hand section 13 described above. Accordingly, the same reference numerals with the suffix "a" are employed to identify similar elements. It will be noted that the left-hand section 14 is provided with two pairs of steam inlet conduits 20a, 21a and an exhaust steam outlet conduit 34a and that the steam inlet conduits 20a, 21a are provided with motive steam by the branch conduits 24a, 25a as controlled by the governing valves 38a. Also, the exhaust outlet 34a is connected to the conduit structure 45, so that during normal operation the exhaust steam from the left-hand section 14 is directed through the reheater 44 jointly with the exhaust steam from the exhaust outlet 34 of the right-hand section 13.

Here again, there is provided a bypass conduit structure 57a communicating with the steam inlet structure 21a and the exhaust outlet structure 34a and having a check valve 58a interposed therein.

Since it will now be seen that the left-hand section 14 is arranged and operates in substantially the same manner as the right-hand section 13 during normal operation as well as after emergency shut-down, as explained above, it need not be further described. However, it must be pointed out that after the emergency shut-down occurs and a volume of steam is entrapped in the left-hand section 14, the check valve 58a is effective to permit free recirculation of the entrapped steam from the exhaust outlet 34a through the inlet structure 21a, and thence through the turbine blading.

Although in the above-described arrangement two bypass conduits 57, 57a and associated check valve structures 58, 58a have been employed for respective operation in connection with the right-hand section 13 and the left-hand section 14 of the turbine 11, it will now be seen that if desired only one bypass conduit and check valve may be employed since the exhaust outlets 34 and 34a are both in communication with the exhaust space 33 and are connected to the same interconnecting conduit structure 45 and the reheater 44. For example, if the bypass 57a and check valve 58a are omitted, part of the entrapped steam in the left-hand section 14 will be conducted from the exhaust outlet 34a, through the conduit 45 and thence through the bypass conduit 57, while the remainder will join right-hand section flow in the exhaust space 33 and flow through the exhaust outlet 34.

It will now be seen that the invention provides a simple yet highly effective arrangement to minimize overheating of a turbine unit in a multi-unit elastic fluid power plant equipped with emergency valve structure for interrupting flow of steam from the boiler to the said unit and from said unit to a lower pressure turbine unit.

It will further be seen that, since the valves 58 and 58a are responsive to prevailing steam pressure, the heretofore required electrical circuitry and dumping system arrangements employed in the prior art are not required while still assuring that said turbine unit is not subjected to excessive steam temperature conditions after an emergency shut-down.

Although only one embodiment of the invention has been shown, it is intended to claim all such modifications as fall within the spirit and scope of the present invention.

I claim as my invention:

1. In a multi-unit elastic fluid turbine power plant comprising
   a high pressure turbine having a rotor,
   means including a first conduit for supplying hot pressurized motive fluid to said high pressure turbine,
   a lower pressure turbine,
   means including a second conduit for supplying said lower pressure turbine with the motive fluid after partial expansion in said high pressure turbine,
   a first valve in said first conduit,
   a second valve in said second conduit,
   said valves being disposed in an open position during normal operating conditions but closable to interrupt flow of motive fluid to said turbines, whereby the hot motive fluid entrapped in said high pressure turbine is subjected to compressive overheating by continued rotation of said rotor due to the moment of inertia of the latter, and
   means including a third valve interposed between said first and second conduits and movable in opening direction in response to the differential in fluid pressure between said conduits when said first and second valves are closed, whereby the trapped motive fluid is freely circulated through said third valve and said high pressure turbine.

2. In a multi-unit elastic fluid turbine power plant comprising
   a high pressure turbine having a rotor,
   means including a first conduit for supplying hot pressurized motive fluid to said high pressure turbine,
   a lower pressure turbine, means including a second conduit for supplying said lower pressure turbine with the motive fluid after partial expansion in said high pressure turbine, a reheater in said second conduit for reheating said partially expanded motive fluid before admission to said lower pressure turbine, a first valve in said first conduit, a second valve in said second conduit, said valves being disposed in an open position during normal operating conditions but closable to interrupt flow of motive fluid to said turbines, whereby the hot motive fluid entrapped in said high pressure turbine is subjected to compressive overheating by continued rotation of said rotor due to the moment of inertia of the latter, and means including a check valve interposed between said first and second conduits, downstream of said first valve and upstream of said second valve, said check valve being closed during normal operating conditions but movable in opening direction in response to the differential in fluid pressure between said conduits when said first and second valves are closed, whereby the trapped motive fluid is freely circulated through said check valve and said high pressure turbine.

3. In a multi-unit elastic fluid turbine power plant comprising a high pressure turbine having a rotor, means including a first conduit for supplying hot pressurized motive fluid to said high pressure turbine, a lower pressure turbine, means including a second conduit for supplying said lower pressure turbine with the motive fluid after partial expansion in said high pressure turbine, a first valve in said first conduit, a second valve in said second conduit, said valves being disposed in an open position during normal operating conditions but substantially jointly closable to interrupt flow of motive fluid to said turbines in response to an abnormal speed condition of said rotor, whereby the hot motive fluid entrapped in said high pressure turbine is subjected to compressive overheating by continued rotation of said rotor due to the moment of inertia of the latter, and means including a pressure responsive check valve interposed between said first and second conduits downstream of said first valve and upstream of said second valve, said pressure responsive valve being maintained closed when said first and second valves are in the open position but movable in opening direction in response to the differential in fluid pressure between said conduits when said first and second valves are closed, whereby the trapped motive fluid is freely circulated in a substantial loop through said pressure responsive valve, said first and second conduits and said high pressure turbine.

4. A multi-unit elastic fluid turbine power plant comprising a double opposed flow turbine having a rotor, first conduit structure for supplying hot pressurized motive fluid to said turbine, a second turbine, second conduit structure for directing the motive fluid after partial expansion in said double flow turbine to said second turbine, first valve structure in said first conduit structure for controlling flow of said motive fluid to said double flow turbine, second valve structure in said second conduit structure for controlling the flow of said partially expanded motive fluid to said second turbine, said valve structures being disposed in an open position during normal operating conditions but substantially jointly closable in response to a dangerous speed condition of said rotor, whereby the hot motive fluid entrapped in said double flow turbine is subjected to overheating by continued rotation of said rotor as a compressor due to the moment of inertia of the latter, and means including a third valve interposed between said first and second conduit structure downstream of said first valve structure and upstream of said second valve structure, said third valve being maintained in closed position when said first and second valve structures are in the open position and movable to an open position when said first and second valves are moved to the closed position, whereby the trapped motive fluid is permitted to freely circulate through said double flow turbine.

5. The structure recited in claim 4 wherein the third valve structure is a pressure responsive valve and is movable to the open position in response to the differential in fluid pressure between the second and first conduit structures.

6. The structure recited in claim 4 and further including a motive fluid reheater interposed in the second conduit structure upstream of the second valve structure, and the third valve structure is a check valve movable to the open position in response to the fluid pressure imparted to the entrapped motive fluid by the compressor action of the rotor.

References Cited by the Examiner

UNITED STATES PATENTS

| | | | |
|---|---|---|---|
| 1,620,662 | 3/1927 | Kasley | 60—70 |
| 1,620,663 | 3/1927 | Kasley | 253—70 |
| 1,726,561 | 9/1929 | Hodgkinson et al. | 60—73 |
| 2,232,852 | 2/1941 | Hemenway | 60—43 |
| 3,097,487 | 7/1963 | Clark | 60—73 |

MARK NEWMAN, *Primary Examiner.*

R. R. BUNEVICH, *Assistant Examiner.*